(12) United States Patent
Venugopal et al.

(10) Patent No.: US 11,184,077 B2
(45) Date of Patent: Nov. 23, 2021

(54) FACILITATING UPLINK BEAM SELECTION FOR A USER EQUIPMENT

(71) Applicant: QUALCOMM Incorporated, San Diego, CA (US)

(72) Inventors: Kiran Venugopal, Raritan, NJ (US); Makesh Pravin John Wilson, San Diego, CA (US); Wooseok Nam, San Diego, CA (US); Tianyang Bai, Bridgewater, NJ (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/258,144

(22) Filed: Jan. 25, 2019

(65) Prior Publication Data

US 2020/0044720 A1 Feb. 6, 2020

Related U.S. Application Data

(60) Provisional application No. 62/714,511, filed on Aug. 3, 2018.

(51) Int. Cl.
*H04B 7/06* (2006.01)
*H04W 24/10* (2009.01)
(Continued)

(52) U.S. Cl.
CPC .......... *H04B 7/0695* (2013.01); *H04B 7/063* (2013.01); *H04W 24/10* (2013.01);
(Continued)

(58) Field of Classification Search
CPC .... H04B 7/0695; H04B 7/063; H04B 7/0413; H04W 24/10; H04W 72/046; H04W 72/0406
See application file for complete search history.

(56) References Cited

U.S. PATENT DOCUMENTS

2012/0014343 A1* 1/2012 Womack ............. H04L 27/2662
                                                           370/329
2013/0182683 A1 7/2013 Seol et al.
(Continued)

FOREIGN PATENT DOCUMENTS

CA        3042828 A1     5/2018
WO    WO-2017214969 A1  12/2017
WO    WO-2018131945 A1   7/2018

OTHER PUBLICATIONS

International Search Report and Written Opinion—PCT/US2019/041016—ISA/EPO—dated Nov. 18, 2019.
(Continued)

*Primary Examiner* — Kwang B Yao
*Assistant Examiner* — Xuan Lu
(74) *Attorney, Agent, or Firm* — Harrity & Harrity, LLP

(57) ABSTRACT

Various aspects of the present disclosure generally relate to wireless communication. In some aspects, a user equipment (UE) may determine that the UE has data to transmit. The user equipment may transmit, to a base station (BS) and based at least in part on determining that the UE has the data to transmit, a plurality of communications on a plurality of uplink beams to trigger the BS to perform beam measurements for the uplink beams. The user equipment may receive information that identifies a subset of the plurality of uplink beams to be used for an uplink data transmission based at least in part on transmitting the communications. The user equipment may transmit the uplink data transmission on the subset of the uplink beams based at least in part on receiving the information that identifies the subset of the uplink beams. Numerous other aspects are provided.

30 Claims, 12 Drawing Sheets

(51) Int. Cl.
    *H04W 72/04* (2009.01)
    *H04B 7/0413* (2017.01)
    *H04B 7/0404* (2017.01)
    *H04W 24/08* (2009.01)

(52) U.S. Cl.
    CPC ......... *H04W 72/046* (2013.01); *H04B 7/0413* (2013.01); *H04W 72/0406* (2013.01)

(56) References Cited

U.S. PATENT DOCUMENTS

| | | | | |
|---|---|---|---|---|
| 2017/0207843 | A1* | 7/2017 | Jung | H04W 74/006 |
| 2019/0081751 | A1* | 3/2019 | Miao | H04W 72/0406 |
| 2019/0124538 | A1* | 4/2019 | Tang | H04W 24/10 |
| 2019/0174525 | A1* | 6/2019 | Kwak | H04W 72/1268 |
| 2019/0199412 | A1* | 6/2019 | Koskela | H04B 7/088 |
| 2019/0372734 | A1* | 12/2019 | Choi | H04L 25/0224 |
| 2020/0014514 | A1* | 1/2020 | Gao | H04W 72/042 |
| 2020/0014515 | A1* | 1/2020 | Qin | H04L 5/00 |
| 2020/0145079 | A1* | 5/2020 | Marinier | H04W 74/0833 |
| 2021/0176797 | A1* | 6/2021 | Kang | H04L 25/0226 |

OTHER PUBLICATIONS

OPPO: "Discussion on Remaining Issues of Beam Management," 3GPP DRAFT; R1-1719987, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051369683, 7 Pages, Retrieved from the Internet: URL: http://www.3gpp.org/ftp/tsg%5Fran/WG1%5FRL1/TSGR1%5F91/Docs/ [retrieved on Nov. 18, 2017] p. 5-p. 6.

VIVO: "Discussion on Beam Management for NR MIMO," 3GPP DRAFT; R1-1700274_Discussion on Beam Management for NR MIMO, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 9, 2017, XP051202242, 7 pages, Retrieved from the Internet: URL: http://www.3gpp.org/ftp/tsg_ran/WG1_RL1/TSGR1_AH/NR_AH_1701/Docs/ [retrieved on Jan. 9, 2017] p. 2-p. 3; figure 4 p. 5-p. 7.

* cited by examiner

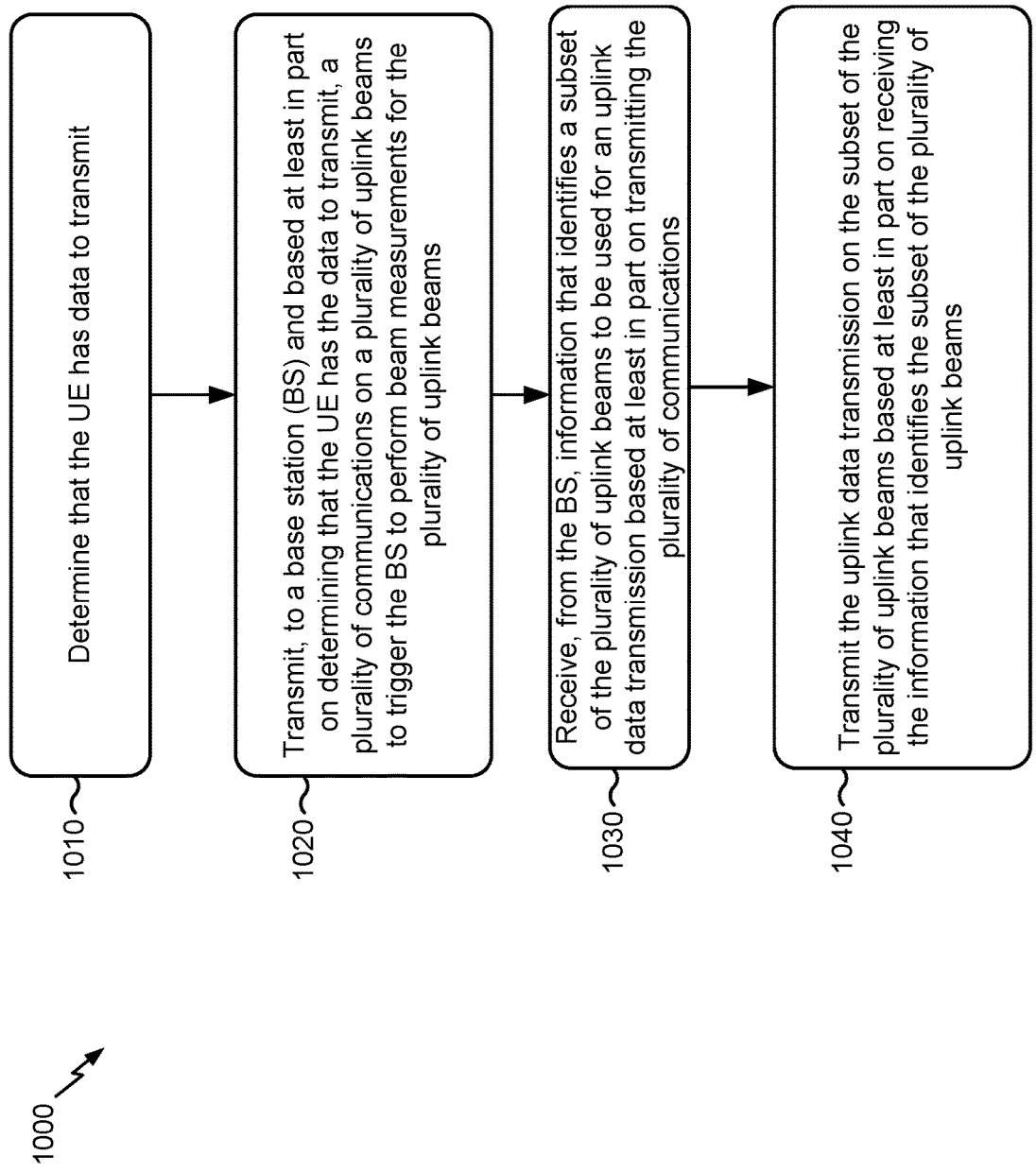

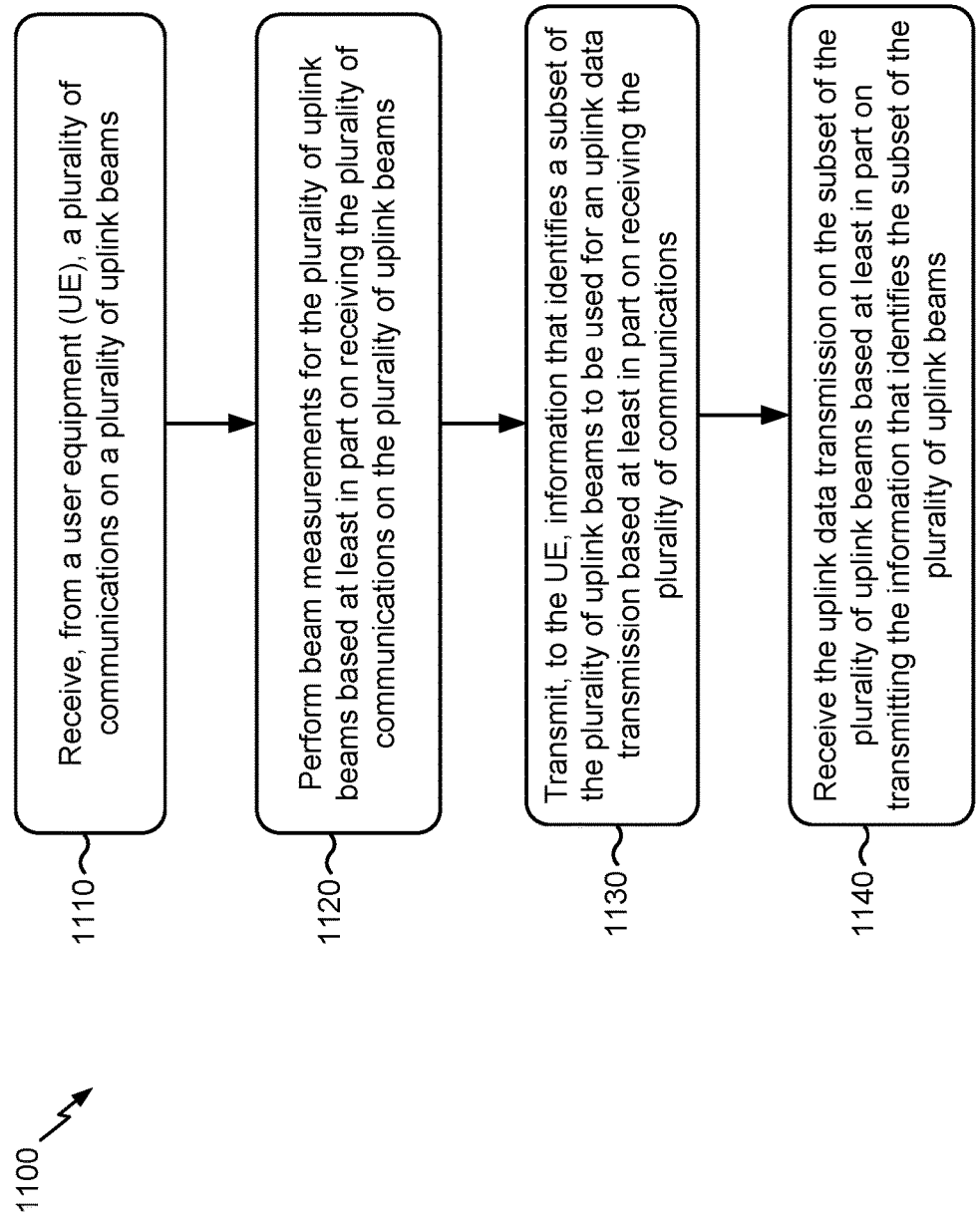

FACILITATING UPLINK BEAM SELECTION FOR A USER EQUIPMENT

CROSS-REFERENCE TO RELATED APPLICATION UNDER 35 U.S.C. § 119

This application claims priority to U.S. Provisional Patent Application No. 62/714,511, filed on Aug. 3, 2018, entitled "FACILITATING UPLINK BEAM SELECTION FOR A USER EQUIPMENT," which is hereby expressly incorporated by reference herein.

TECHNICAL FIELD OF THE DISCLOSURE

Aspects of the technology described below generally relate to wireless communication, and more particularly to techniques and apparatuses for facilitating uplink beam selection for a user equipment. Some techniques and apparatuses described herein enable and provide wireless communication devices and systems configured for low latency scenarios and low power scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, an eNB, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a user equipment (UE), may include determining that the UE has data to transmit; transmitting, to a base station (BS) and based at least in part on determining that the UE has the data to transmit, a plurality of communications on a plurality of uplink beams to trigger the BS to perform beam measurements for the plurality of uplink beams; receiving, from the BS, information that identifies a subset of the plurality of uplink beams to be used for an uplink data transmission based at least in part on transmitting the plurality of communications; and transmitting the uplink data transmission on the subset of the plurality of uplink beams based at least in part on receiving the information that identifies the subset of the plurality of uplink beams.

In some aspects, a user equipment for wireless communication may include memory and one or more processors operatively coupled to the memory. The memory and the one or more processors may be configured to determine that the UE has data to transmit; transmit, to a BS and based at least in part on determining that the UE has the data to transmit, a plurality of communications on a plurality of uplink beams to trigger the BS to perform beam measurements for the plurality of uplink beams; receive, from the BS, information that identifies a subset of the plurality of uplink beams to be used for an uplink data transmission based at least in part on transmitting the plurality of communications; and transmit the uplink data transmission on the subset of the plurality of uplink beams based at least in part on receiving the information that identifies the subset of the plurality of uplink beams.

In some aspects, a non-transitory computer-readable medium may store one or more instructions for wireless communication. The one or more instructions, when executed by one or more processors of a UE, may cause the one or more processors to determine that the UE has data to transmit; transmit, to a BS and based at least in part on determining that the UE has the data to transmit, a plurality of communications on a plurality of uplink beams to trigger the BS to perform beam measurements for the plurality of uplink beams; receive, from the BS, information that identifies a subset of the plurality of uplink beams to be used for an uplink data transmission based at least in part on transmitting the plurality of communications; and transmit the uplink data transmission on the subset of the plurality of uplink beams based at least in part on receiving the information that identifies the subset of the plurality of uplink beams.

In some aspects, an apparatus for wireless communication may include means for determining that the apparatus has data to transmit; means for transmitting, to a BS and based at least in part on determining that the apparatus has the data to transmit, a plurality of communications on a plurality of uplink beams to trigger the BS to perform beam measurements for the plurality of uplink beams; means for receiving, from the BS, information that identifies a subset of the plurality of uplink beams to be used for an uplink data transmission based at least in part on transmitting the plurality of communications; and means for transmitting the uplink data transmission on the subset of the plurality of uplink beams based at least in part on receiving the information that identifies the subset of the plurality of uplink beams.

In some aspects, a method of wireless communication, performed by a BS, may include receiving, from a UE, a plurality of communications on a plurality of uplink beams; performing beam measurements for the plurality of uplink beams based at least in part on receiving the plurality of communications on the plurality of uplink beams; transmitting, to the UE, information that identifies a subset of the plurality of uplink beams to be used for an uplink data transmission based at least in part on receiving the plurality of communications; and receiving the uplink data transmission on the subset of the plurality of uplink beams based at least in part on transmitting the information that identifies the subset of the plurality of uplink beams.

In some aspects, a base station for wireless communication may include memory and one or more processors operatively coupled to the memory. The memory and the one or more processors may be configured to receive, from a UE, a plurality of communications on a plurality of uplink beams; perform beam measurements for the plurality of uplink beams based at least in part on receiving the plurality of communications on the plurality of uplink beams; transmit, to the UE, information that identifies a subset of the plurality of uplink beams to be used for an uplink data transmission based at least in part on receiving the plurality of communications; and receive the uplink data transmission on the subset of the plurality of uplink beams based at least in part on transmitting the information that identifies the subset of the plurality of uplink beams.

In some aspects, a non-transitory computer-readable medium may store one or more instructions for wireless communication. The one or more instructions, when executed by one or more processors of a B S, may cause the one or more processors to receive, from a UE, a plurality of communications on a plurality of uplink beams; perform beam measurements for the plurality of uplink beams based at least in part on receiving the plurality of communications on the plurality of uplink beams; transmit, to the UE, information that identifies a subset of the plurality of uplink beams to be used for an uplink data transmission based at least in part on receiving the plurality of communications; and receive the uplink data transmission on the subset of the plurality of uplink beams based at least in part on transmitting the information that identifies the subset of the plurality of uplink beams.

In some aspects, an apparatus for wireless communication may include means for receiving, from a UE, a plurality of communications on a plurality of uplink beams; means for performing beam measurements for the plurality of uplink beams based at least in part on receiving the plurality of communications on the plurality of uplink beams; means for transmitting, to the UE, information that identifies a subset of the plurality of uplink beams to be used for an uplink data transmission based at least in part on receiving the plurality of communications; and means for receiving the uplink data transmission on the subset of the plurality of uplink beams based at least in part on transmitting the information that identifies the subset of the plurality of uplink beams.

Aspects generally include a method, apparatus, system, computer program product, non-transitory computer-readable medium, user equipment, base station, wireless communication device, and processing system as substantially described herein with reference to and as illustrated by the accompanying drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, for example, by a user equipment, in accordance with various aspects of the present disclosure.

FIG. 11 is a diagram illustrating an example process performed, for example, by a base station, in accordance with various aspects of the present disclosure.

DETAILED DESCRIPTION

Figure 1:
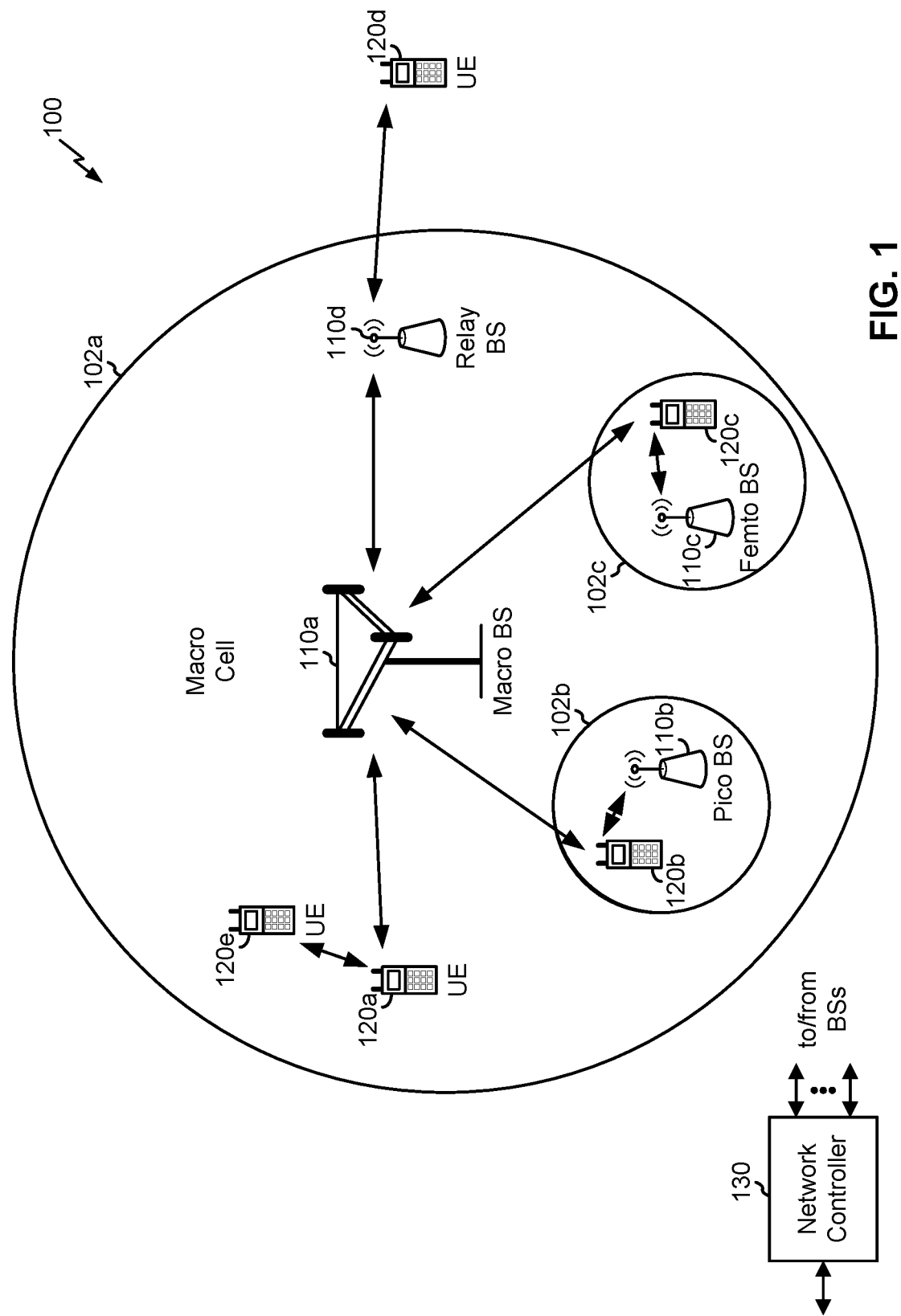
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also include additional components and features for implementation and practice of claimed and described embodiments. For example, transmission and reception of wireless signals includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
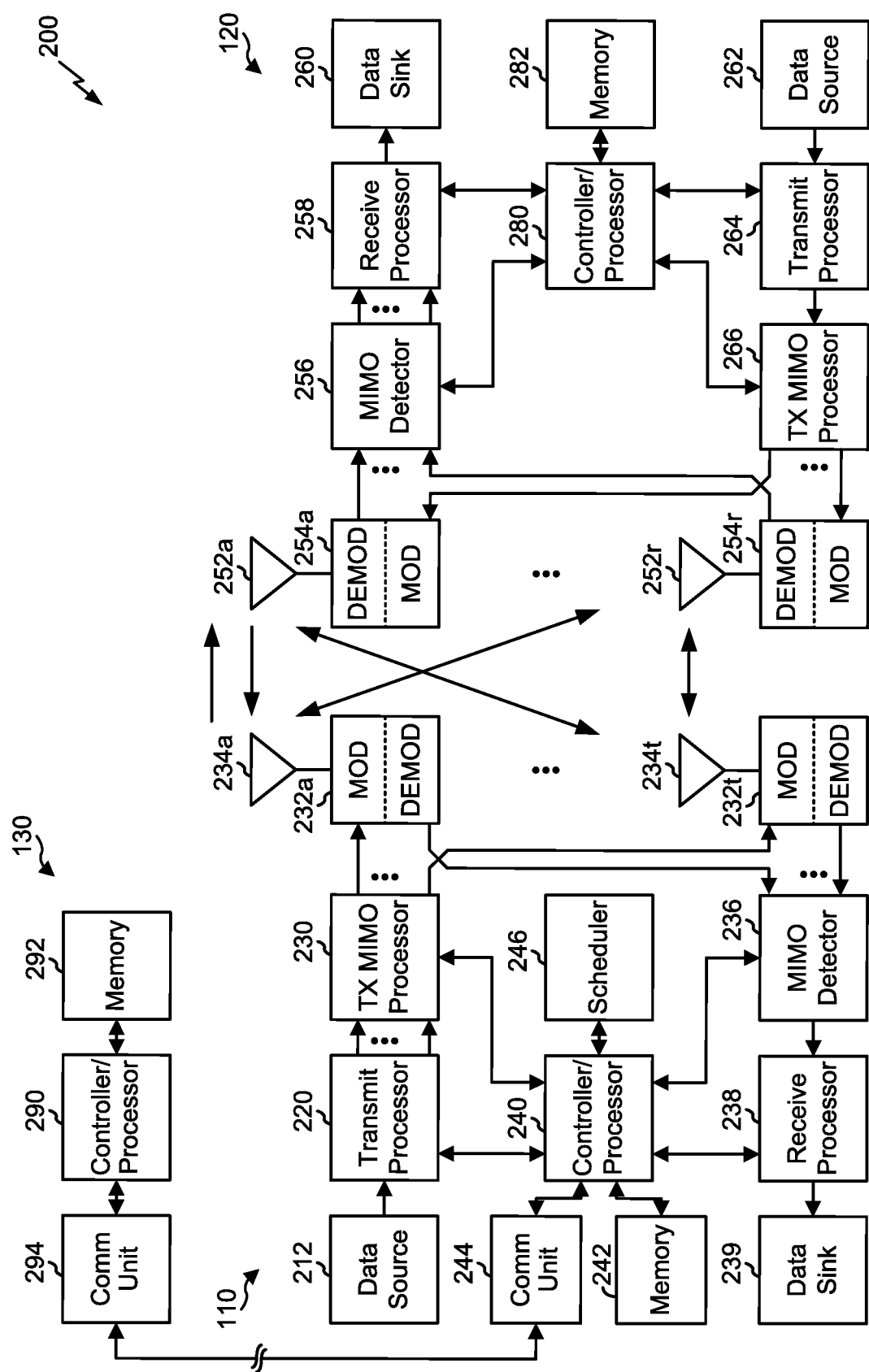
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with facilitating uplink beam selection for UE 120, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that the UE has data to transmit, means for transmitting, to a base station (BS) and based at least in part on determining that the UE has the data to transmit, a plurality of communications on a plurality of uplink beams to trigger the BS to perform beam measurements for the plurality of uplink beams, means for receiving, from the BS, information that identifies a subset of the plurality of uplink beams to be used for an uplink data transmission based at least in part on transmitting the plurality of communications, means for transmitting the uplink data transmission on the subset of the plurality of uplink beams based at least in part on receiving the information that identifies the subset of the plurality of uplink beams, and/or the like. In some aspects, such means may include one or more components of UE 120 described in connection with FIG. 2.

In some aspects, base station 110 may include means for receiving, from a user equipment (UE), a plurality of communications on a plurality of uplink beams, means for performing beam measurements for the plurality of uplink beams based at least in part on receiving the plurality of communications on the plurality of uplink beams, means for transmitting, to the UE, information that identifies a subset of the plurality of uplink beams to be used for an uplink data transmission based at least in part on receiving the plurality of communications, means for receiving the uplink data transmission on the subset of the plurality of uplink beams based at least in part on transmitting the information that identifies the subset of the plurality of uplink beams, and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
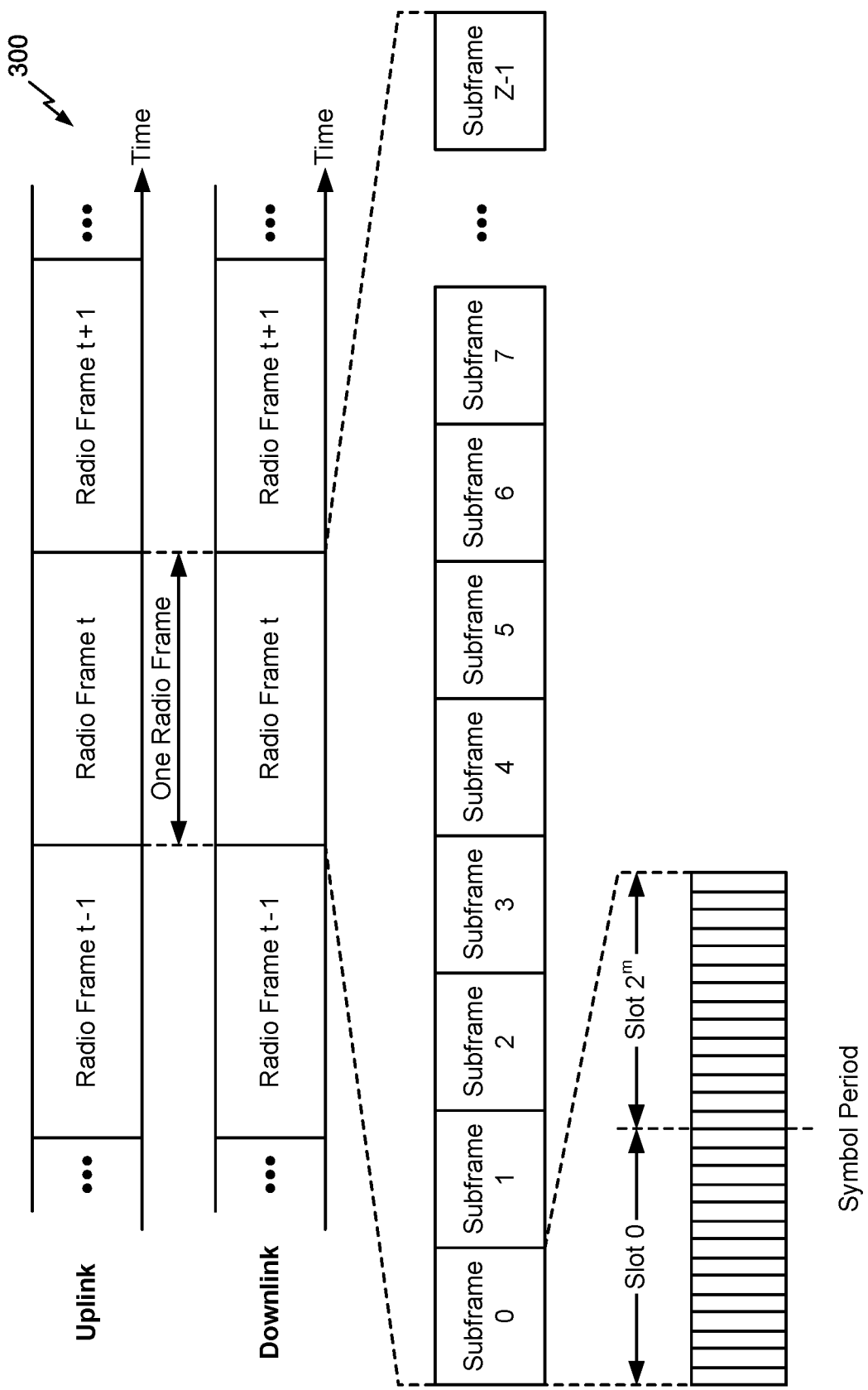
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
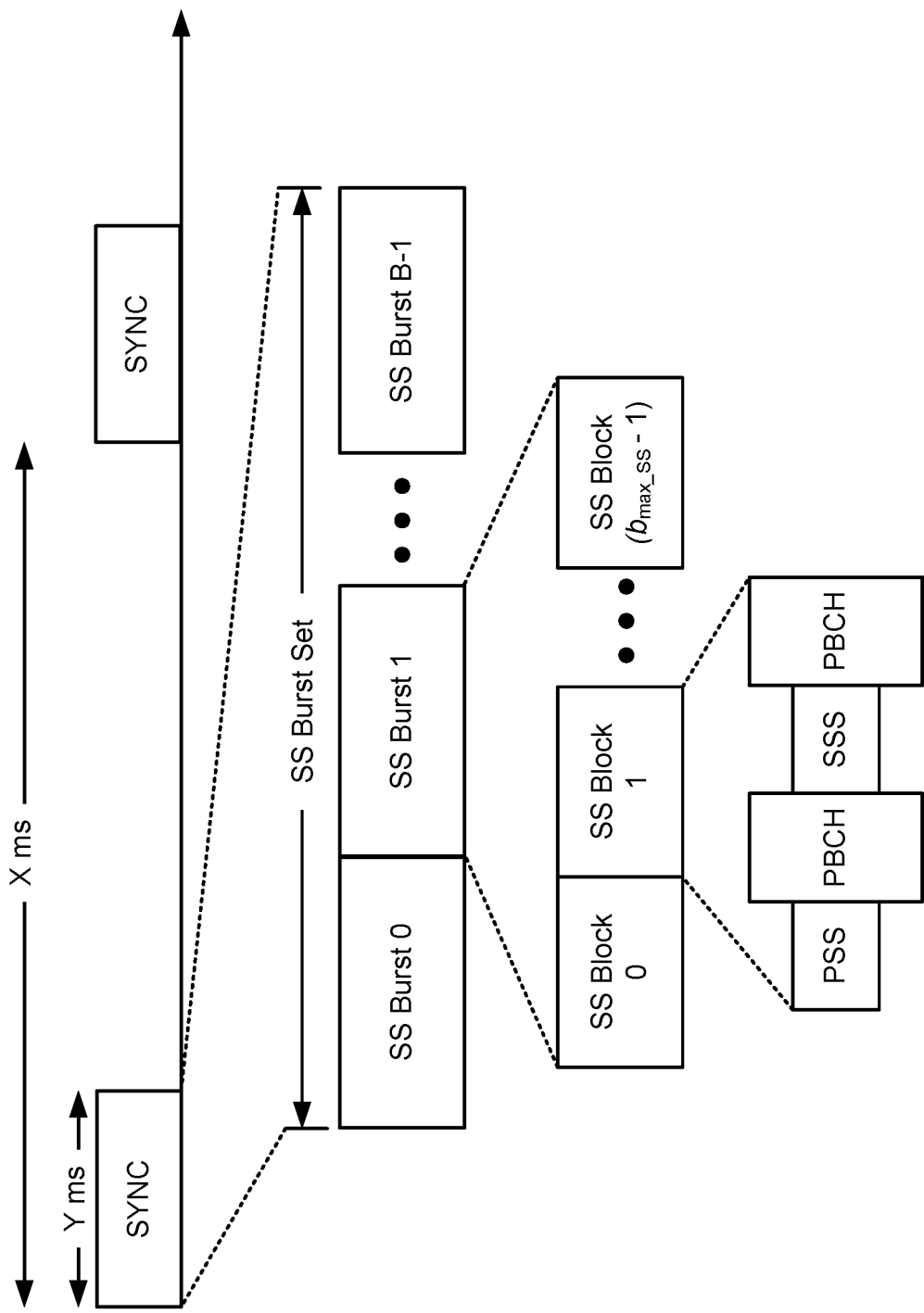
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
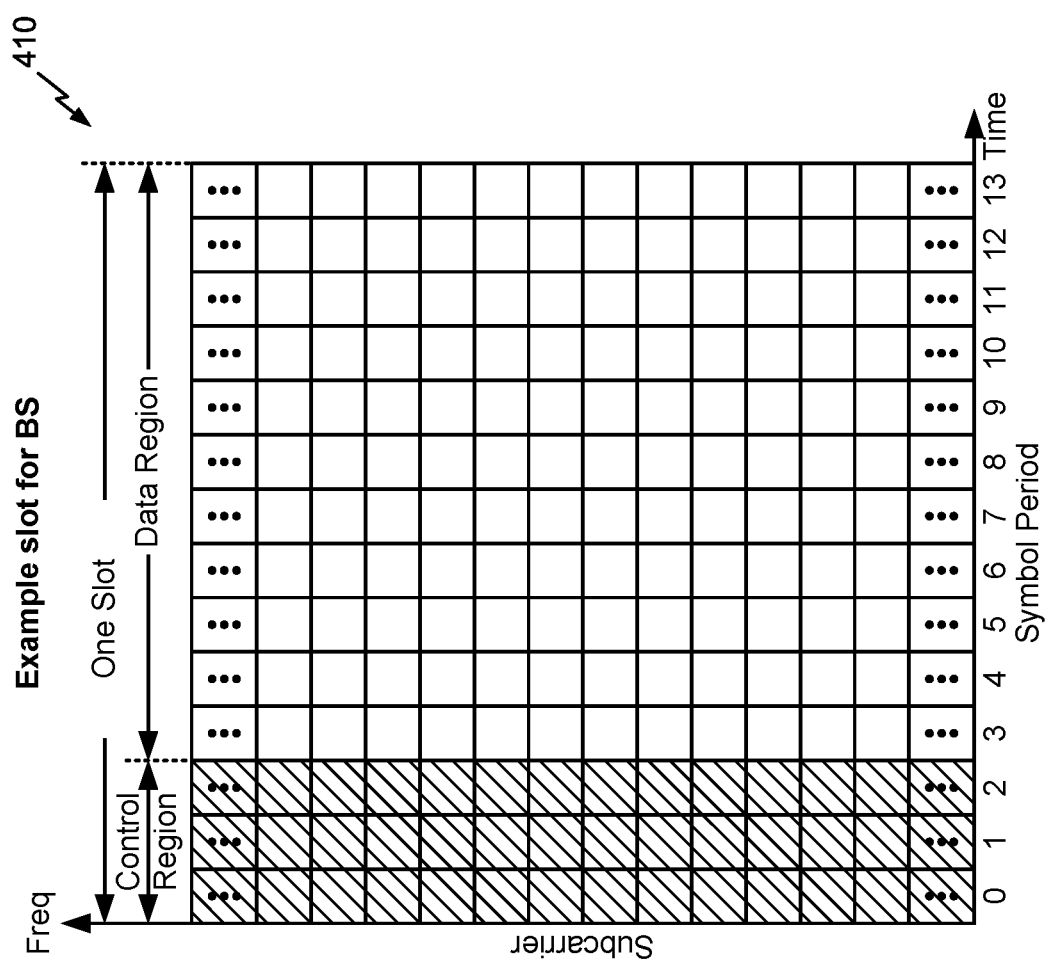
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
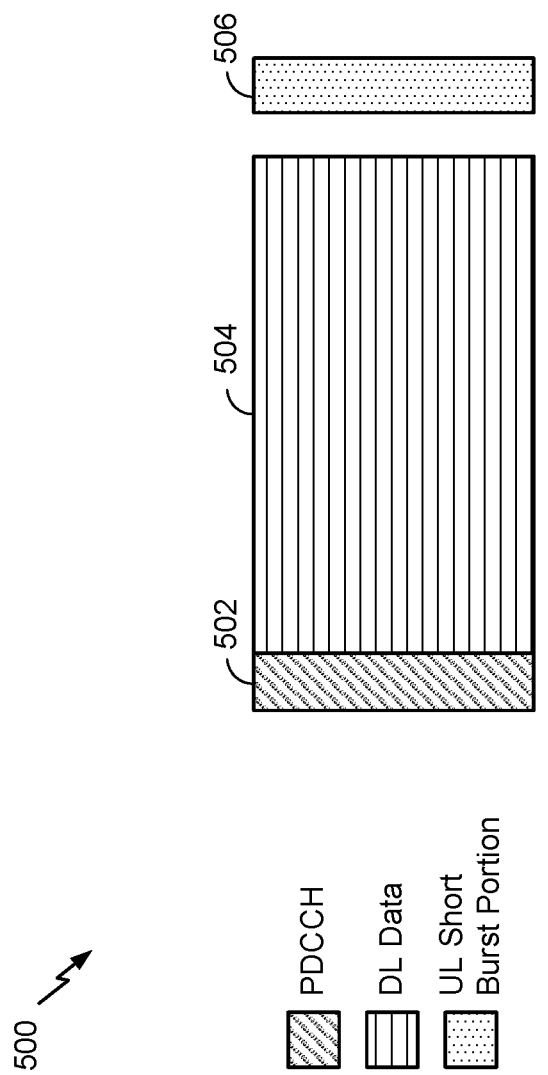
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include a UL short burst portion 506. The UL short burst portion 506 may sometimes be referred to as a UL burst, a UL burst portion, a common UL burst, a short burst, a UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples may differ from what is described with regard to FIG. 5.

Figure 6:
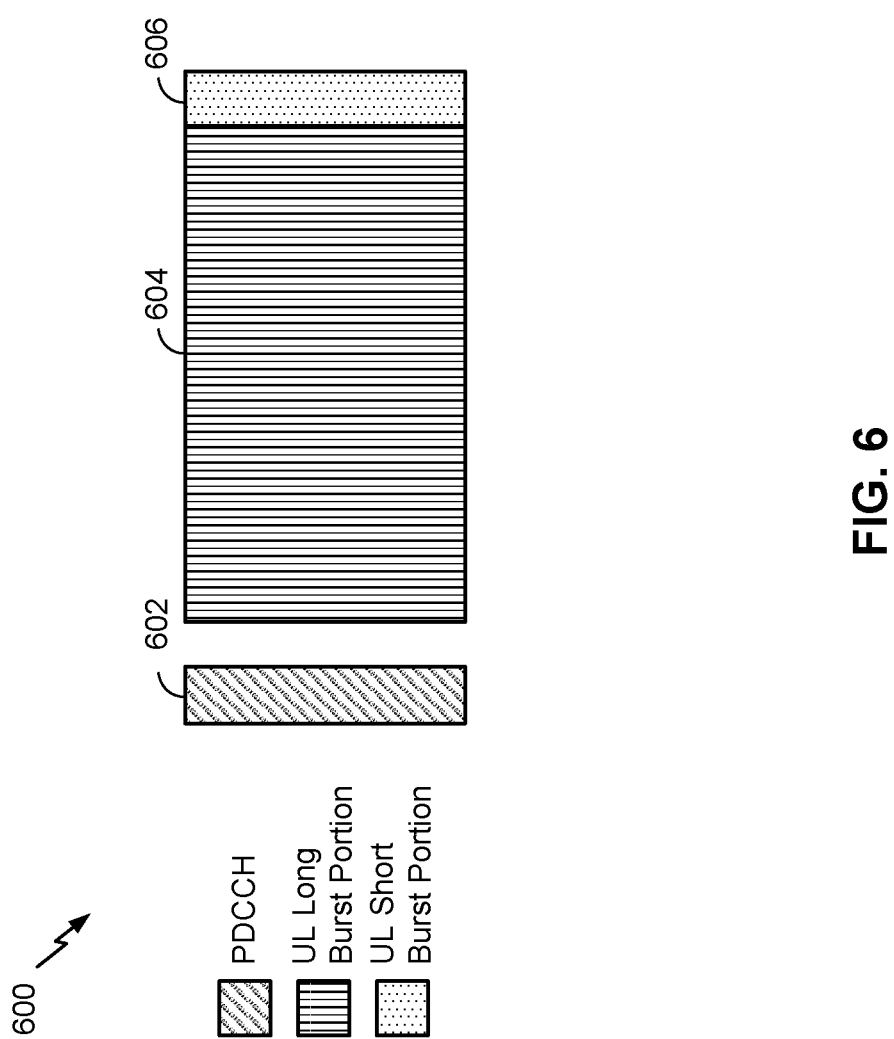
FIG. 6 is a diagram illustrating an example of an uplink (UL)-centric slot, in accordance with various aspects of the present disclosure.

FIG. 6 is a diagram 600 showing an example of a UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include a UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include a UL short burst portion 606. The UL short burst portion 606 in FIG. 6 may be similar to the UL short burst portion 506 described above with reference to FIG. 5, and may include any of the information described above in connection with FIG. 5. The foregoing is merely one example of a UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples may differ from what is described with regard to FIG. 6.

When a UE has data to transmit to a BS, the UE and/or a BS may select an uplink beam on which the UE is to transmit the data. Selection of an uplink beam may be based at least in part on a beam measurement performed by the BS. Typically, the process for selecting an uplink beam includes transmitting, by the UE, a scheduling request (SR) via a configured SR resource (with a retransmission of the SR in a next SR period if the UE does not receive a scheduling grant from the BS), triggering, by the BS, an aperiodic channel state information-reference signal (AP CSI-RS) and/or an aperiodic sounding reference signal (SRS) for the UE's beam measurement and reporting, determining, by the BS, an uplink beam for the UE to use, and scheduling, by the BS, a PUSCH with the uplink beam.

This process can result in signification delay between when the UE determines to transmit data and the actual transmission of the data by the UE. For example, if the UE does not receive a scheduling grant for an SR, the UE may need to retransmit the SR in the next SR period. Additionally, or alternatively, and as another example, by waiting for the BS to trigger an AP CSI-RS and/or an aperiodic SRS, significant latency is introduced into the process of selecting an uplink beam that the UE is to use to transmit data, and/or the like.

Some aspects described herein provide a UE that is capable of triggering beam measurements of a plurality of uplink beams that the UE may possibly use for an uplink data transmission. In this way, the UE does not need to wait for a BS to trigger an AP CSI-RS, an aperiodic SRS, and/or the like to initiate a beam measurement and/or beam selection process. This reduces or eliminates latency typically associated with the beam measurement and/or beam selection process, thereby facilitating deployment of the UE and/or the BS in low latency scenarios. In addition, this reduces communications between the UE and the BS related to the beam measurement and/or beam selection process, thereby conserving network resources, such as bandwidth, time and/or frequency resources, and/or the like between the UE and the BS. Further, by reducing communications between the UE and the BS, processing resources that would otherwise be used to process the additional communications are conserved. Further, this reduces an amount of power consumed by the UE and/or the BS with regard to the beam measurement and/or beam selection process, thereby facilitating deployment of the UE and/or the BS in low power scenarios.

Figure 7:
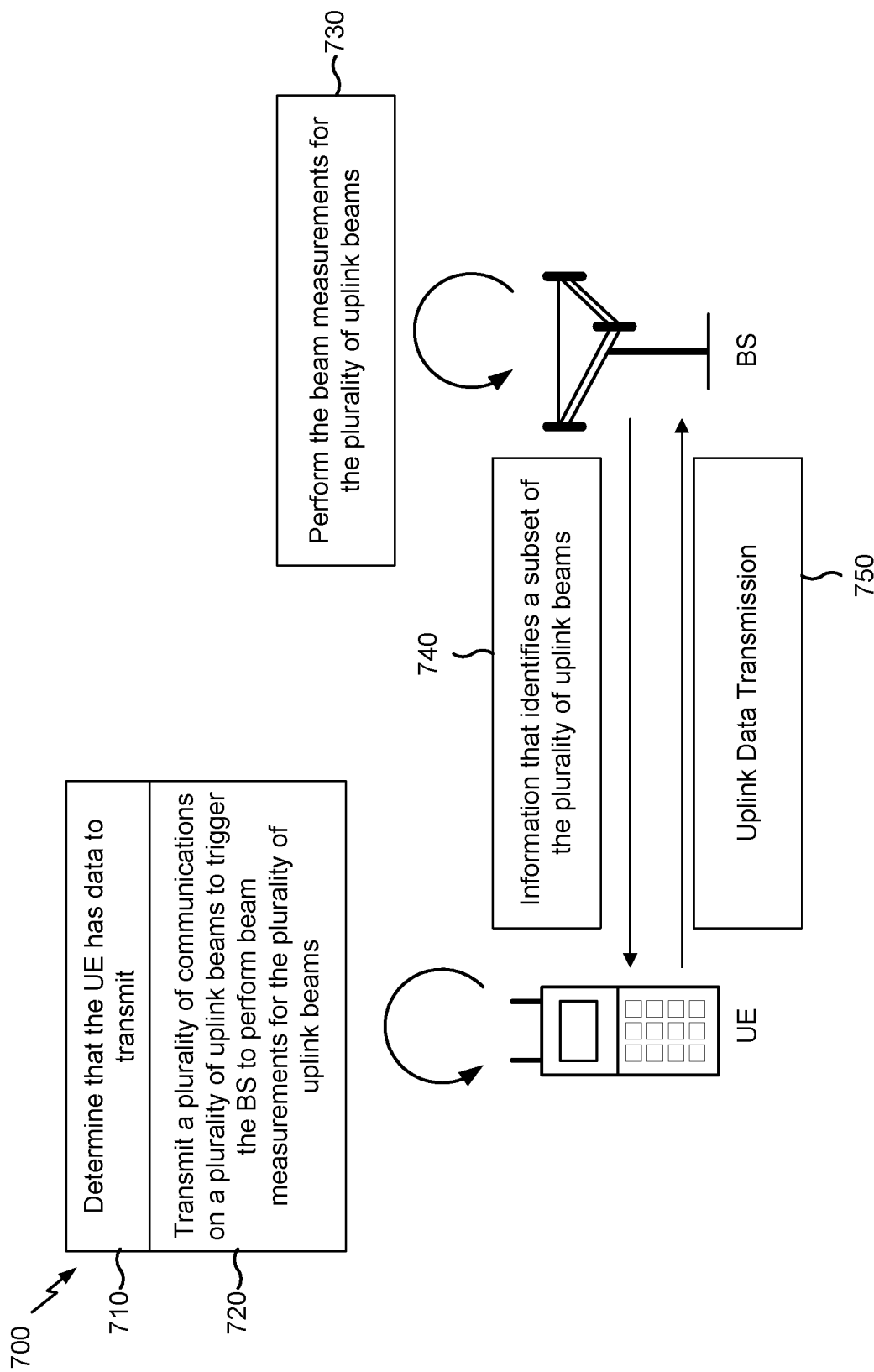
FIG. 7 is a diagram illustrating an example of facilitating uplink beam selection for a user equipment, in accordance with various aspects of the present disclosure.

FIG. 7 is a diagram illustrating an example 700 of facilitating uplink beam selection for a user equipment, in accordance with various aspects of the present disclosure. As shown in FIG. 7, example 700 includes a BS (e.g., BS 110) and a UE (e.g., UE 120).

As shown by reference number 710, the UE may determine that the UE has data to transmit. For example, the UE may determine that the UE has data to transmit based at least in part on input from a user of the UE, based at least in part on an application indicating to the UE that the application has data to transmit, based at least in part on receiving a request for the data from the BS, at a particular time, according to a schedule, based at least in part on attaching to a network associated with the BS, based at least in part on establishing a connection with the BS, and/or the like.

As shown by reference number 720, the UE may transmit, and the BS may receive, a plurality of communications on a plurality of uplink beams to trigger the BS to perform beam measurements for the plurality of uplink beams. For example, the UE may transmit the plurality of communications based at least in part on determining that the UE has the data to transmit. In some aspects, the UE may transmit the plurality of communications at least a threshold amount of time after determining that the UE has the data to transmit, at a scheduled time after determining that the UE has the data to transmit, and/or the like.

In some aspects, the plurality of communications may include a SR. For example, the UE may transmit a plurality of SRs to the BS to trigger the BS to perform the beam measurements (e.g., utilizing SR beam sweeping). Continuing with the previous example, the UE may transmit the plurality of SRs so that the BS can perform the beam measurements on the plurality of uplink beams on which the plurality of SRs are transmitted. In some aspects, a SR indicator (SRI) may be processed for SR selection (e.g., rather than, or in addition to, a normal use of a SRI, such as to indicate a PUSCH transmission associated with a PUSCH beam).

Additionally, or alternatively, the plurality of communications may include a SR and a SRS. For example, the UE may transmit at least one SR to trigger the BS to perform the beam measurements and may transmit at least one SRS so that the BS can perform the beam measurements on the uplink beams on which the at least one SRS is transmitted. In some aspects, the plurality of communications may include a plurality of SRs and/or a plurality of SRSs. In some aspects, when the plurality of communications includes the SR and the SRS, the UE may transmit the SRS after transmitting the SR (e.g., after a pre-configured delay or amount of time has elapsed after transmitting the SR). For example, the UE may transmit the SR and may then transmit the SRS at a later time after a threshold amount of time has elapsed. In some aspects, the BS and/or the UE may configure blind decoding to use an SRS in the manner described herein as SRS resources may be on-demand and blind decoding for the SRS resources may not be enabled by default.

In some aspects, when the plurality of communications includes the SR and the SRS, the UE may transmit the SRS on a same uplink beam, of the plurality of uplink beams, as the SR was transmitted. For example, the UE may transmit the SR on a particular uplink beam, and then may transmit the SRS on the particular uplink beam after a delay. Additionally, or alternatively, when the plurality of communications includes the SR and the SRS, the UE may transmit the SRS on a refined uplink beam of an uplink beam, of the plurality of uplink beams, on which the SR was transmitted. For example, the UE may transmit the SR on a particular uplink beam, and then may transmit the SRS on a refined uplink beam of the particular uplink beam after a delay.

In some aspects, the UE may transmit the plurality of communications in a same slot. For example, the UE may transmit the plurality of SRs in a same slot, may transmit the at least one SR and the at least one SRS in a same slot, and/or the like. This reduces latency associated with triggering the BS to perform the beam measurements. In some aspects, when the UE transmits the plurality of communications in a same slot, the UE may transmit the plurality of communications at different times. For example, the UE may transmit the at least one SR and may transmit the at least one SRS at a later time (e.g., due to a signaling radio bearer (SRB) delay) when the plurality of communications includes the SR and the SRS.

In some aspects, the UE may transmit quasi-co-location (QCL) information for the plurality of uplink beams. For example, the UE may transmit the QCL information in association with transmitting the plurality of communications, based at least in part on transmitting the plurality communications, included in the plurality of communications, and/or the like. Additionally, or alternatively, the UE may transmit a timing of the plurality of uplink beams. For example, the UE may transmit a timing of the plurality of uplink beams (e.g., information that indicates to the BS a time frequency resource on which a communication will be transmitted on an uplink beam, a time frequency resource on which the communication was transmitted on the uplink beam, and/or the like), in a manner similar to that described with regard to the QCL information.

In some aspects, when the plurality of communications includes the SR and the SRS, the UE may transmit the QCL information in association with the SR and not in association with the SRS. For example, the UE may transmit the QCL information in this manner because the SR may be used to trigger the beam measurements by the BS and the SRS may be used by the BS to perform the beam measurements, as described elsewhere herein.

As shown by reference number 730, the BS may perform the beam measurements for the plurality of uplink beams. For example, the BS may perform beam measurements for the uplink beams on which the SR and/or the SRS were transmitted. Continuing with the previous example, when the plurality of communications includes the SR and the SRS, the BS may perform the beam measurements for the uplink beams on which the SRS was transmitted. In some aspects, the BS may determine a signal strength associated with an uplink beam, a signal quality associated with an uplink beam, interference associated with an uplink beam, and/or the like.

In some aspects, when the plurality of communications includes a plurality of SRs (and does not include any SRSs), the BS may utilize SR beam sweeping by the UE to determine the subset of the plurality of uplink beams. For example, the BS may determine the subset of the plurality of uplink beams without receiving an SRS.

As shown by reference number 740, the BS may transmit, and the UE may receive, information that identifies a subset of the plurality of uplink beams. For example, the BS may transmit the information based at least in part on performing the beam measurements, based at least in part on receiving the plurality of communications, and/or the like. In some aspects, the UE may use the subset of the plurality of uplink beams for an uplink data transmission, as described in more detail elsewhere herein.

In some aspects, the BS may transmit the information in association with one or more other downlink transmissions. For example, the BS may transmit the information in association with a physical downlink control channel (PDCCH), a scheduling grant, and/or the like. In this way, the BS may schedule the uplink data transmission for an uplink beam in association with transmitting the information that identifies the subset of the plurality of uplink beams.

As shown by reference number 750, the UE may transmit, and the BS may receive, the uplink data transmission. For example, the UE may transmit the uplink data transmission on the subset of the plurality of uplink beams identified in the information from the BS. In some aspects, the UE may transmit the uplink data transmission based at least in part on selecting the subset of the plurality of uplink beams. For example, the UE may select a particular uplink beam that has a threshold quality, that has a threshold rank relative to other uplink beams, and/or the like (e.g., as determined from the information from the BS). In some aspects, the UE may select multiple uplink beams for multiple uplink data transmissions. In some aspects, the uplink data transmission may include a transmission, from the UE to the BS, of the data that the UE had to transmit.

As indicated above, FIG. 7 is provided as an example. Other examples may differ from what is described with respect to FIG. 7.

Figure 8:
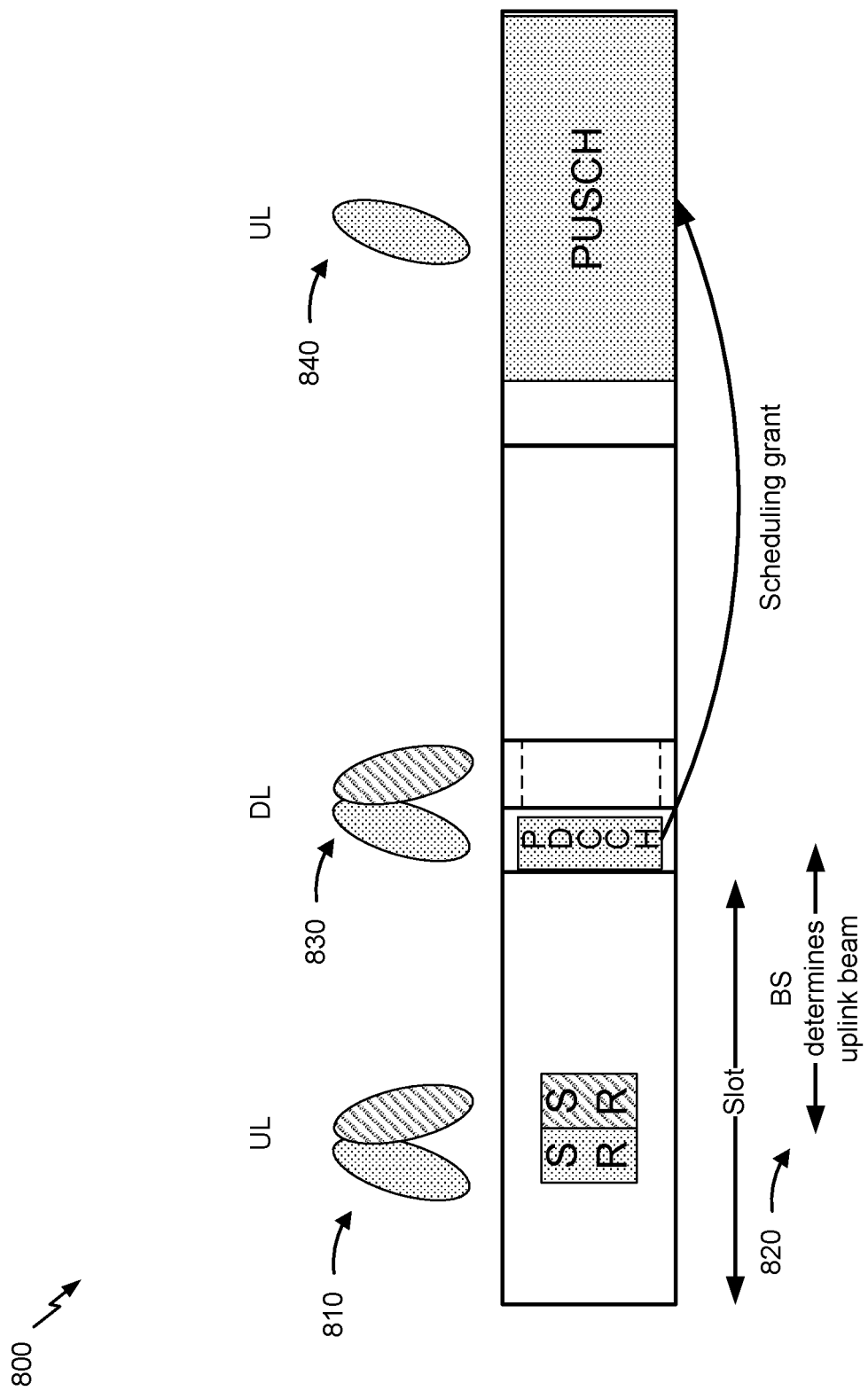
FIG. 8 is a diagram illustrating an example of facilitating uplink beam selection for a user equipment, in accordance with various aspects of the present disclosure.

FIG. 8 is a diagram illustrating an example 800 of facilitating uplink beam selection for a user equipment, in accordance with various aspects of the present disclosure. FIG. 8 shows an example of using a plurality of SRs to determine an uplink beam for an uplink data transmission.

As shown by reference number 810, a UE (e.g., UE 120) (not shown) may transmit the plurality of SRs in an uplink (UL) direction, in a manner similar to that described elsewhere herein. For example, the UE may transmit the plurality of SRs in a same slot. As shown by reference number 820, the BS (e.g., BS 110) (not shown) may determine an uplink beam for the uplink data transmission, in a manner similar to that described elsewhere herein. For example, the BS may determine the uplink beam based at least in part on performing beam measurements for the plurality of SRs. As shown by reference number 830, the BS may transmit information identifying a subset of the uplink beams used for the plurality of SRs that the UE is to use for the uplink data transmission, in a manner similar to that described elsewhere herein. For example, the BS may transmit the information in association with a PDCCH, a scheduling grant, and/or the like. As shown by reference number 840, the UE may transmit the uplink data transmission, in a manner similar to that described elsewhere herein. For example, the UE may transmit a PUSCH on the uplink beam identified in the information from the BS.

As indicated above, FIG. 8 is provided as an example. Other examples may differ from what is described with respect to FIG. 8.

Figure 9:
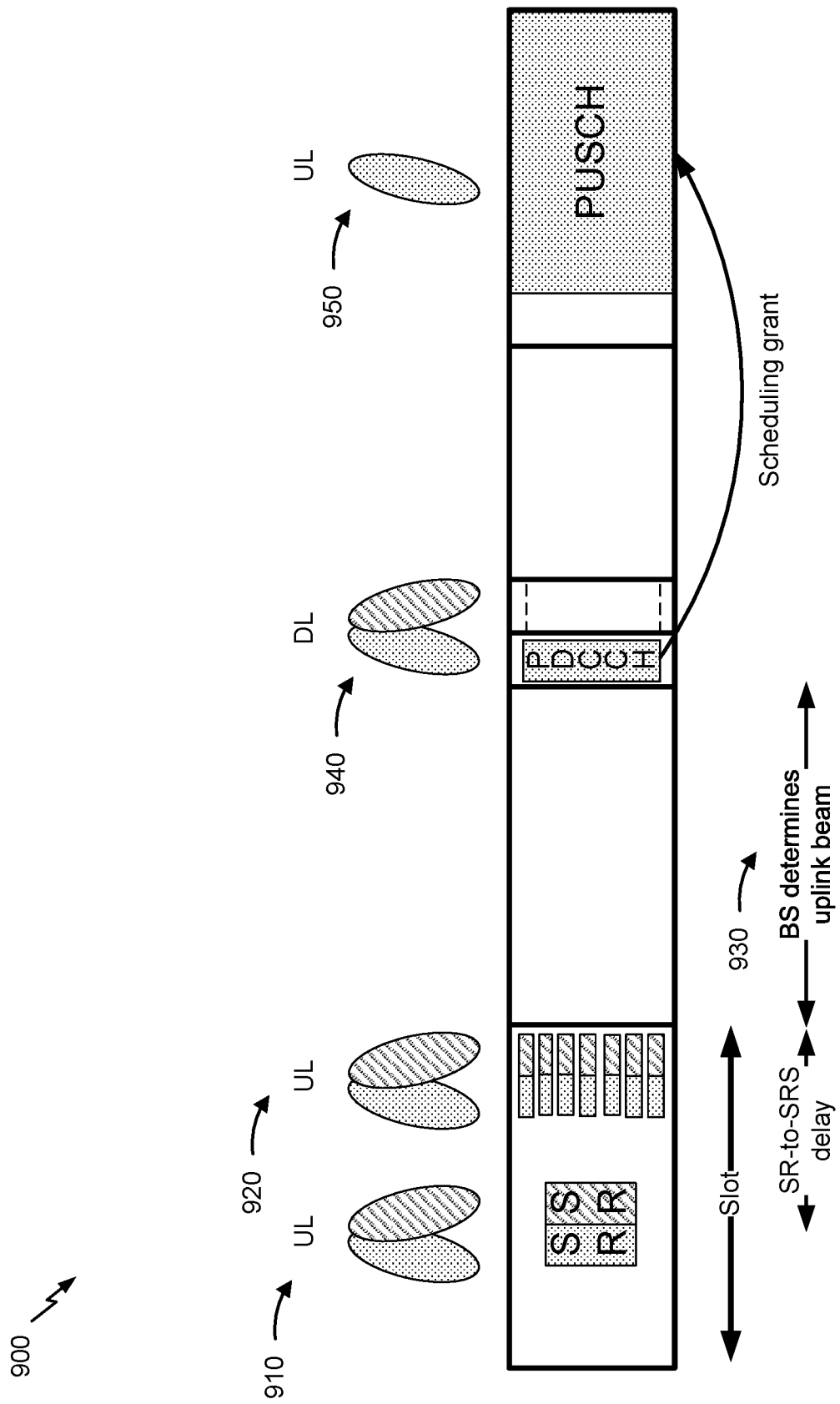
FIG. 9 is a diagram illustrating an example of facilitating uplink beam selection for a user equipment, in accordance with various aspects of the present disclosure.

FIG. 9 is a diagram illustrating an example 900 of facilitating uplink beam selection for a user equipment, in accordance with various aspects of the present disclosure. FIG. 9 shows an example of using at least one SR and at least one SRS to determine an uplink beam for an uplink data transmission.

As shown by reference number 910, a UE (e.g., UE 120) (not shown) may transmit a plurality of SRs in an uplink (UL) direction, in a manner similar to that described elsewhere herein. For example, the UE may transmit the plurality of the SRs in a same slot. As shown by reference number 920, the UE may transmit a plurality of SRSs in a UL direction, in a manner similar to that described elsewhere herein. For example, the UE may transmit the plurality of SRSs after an SR-to-SRS delay (e.g., a configured delay, a threshold amount of delay, and/or the like), in a same slot as the plurality of SRs, and/or the like.

As shown by reference number 930, the BS may determine an uplink beam for the uplink data transmission, in a manner similar to that described elsewhere herein. For example, the BS may determine the uplink beam based at least in part on performing beam measurements for the plurality of SRSs. As shown by reference number 940, the BS may transmit information identifying a subset of the uplink beams used for the plurality of SRSs that the UE is to use for the uplink data transmission, in a manner similar to that described elsewhere herein. For example, the BS may transmit the information in association with a PDCCH, a scheduling grant, and/or the like. As shown by reference number 950, the UE may transmit the uplink data transmission, in a manner similar to that described elsewhere herein.

For example, the UE may transmit a PUSCH on the uplink beam identified in the information from the BS.

As indicated above, FIG. 9 is provided as an example. Other examples may differ from what is described with respect to FIG. 9.

FIG. 10 is a diagram illustrating an example process 1000 performed, for example, by a UE, in accordance with various aspects of the present disclosure. Example process 1000 is an example where a UE (e.g., UE 120) performs facilitation of uplink beam selection for a UE.

As shown in FIG. 10, in some aspects, process 1000 may include determining that the UE has data to transmit (block 1010). For example, the UE (e.g., UE 120 using controller/processor 280 and/or the like) may determine that the UE has data to transmit, in a manner that is the same as or similar to that described elsewhere herein.

As further shown in FIG. 10, in some aspects, process 1000 may include transmitting, to a base station (BS) and based at least in part on determining that the UE has the data to transmit, a plurality of communications on a plurality of uplink beams to trigger the BS to perform beam measurements for the plurality of uplink beams (block 1020). For example, the UE (e.g., UE 120 using controller/processor 280, transmit processor 264, TX MIMO processor 266, MOD 254, antenna 252, and/or the like) may transmit, to a BS and based at least in part on determining that the UE has the data to transmit, a plurality of communications on a plurality of uplink beams to trigger the BS to perform beam measurements for the plurality of uplink beams, in a manner that is the same as or similar to that described elsewhere herein.

As further shown in FIG. 10, in some aspects, process 1000 may include receiving, from the BS, information that identifies a subset of the plurality of uplink beams to be used for an uplink data transmission based at least in part on transmitting the plurality of communications (block 1030). For example, the UE (e.g., UE 120 using antenna 252, DEMOD 254, MIMO detector 256, receive processor 258, controller/processor 280, and/or the like) may receive, from the BS, information that identifies a subset of the plurality of uplink beams to be used for an uplink data transmission based at least in part on transmitting the plurality of communications, in a manner that is the same as or similar to that described elsewhere herein.

As further shown in FIG. 10, in some aspects, process 1000 may include transmitting the uplink data transmission on the subset of the plurality of uplink beams based at least in part on receiving the information that identifies the subset of the plurality of uplink beams (block 1040). For example, the UE (e.g., UE 120 using controller/processor 280 and/or the like) may transmit the uplink data transmission on the subset of the plurality of uplink beams based at least in part on receiving the information that identifies the subset of the plurality of uplink beams, in a manner that is the same as or similar to that described elsewhere herein.

Process 1000 may include additional aspects, such as any single aspect or any combination of aspects described below and/or in connection with one or more other processes described elsewhere herein.

In some aspects, the UE may transmit quasi-co-location (QCL) information for the plurality of uplink beams. In some aspects, the UE may transmit a timing of the plurality of uplink beams that indicates a plurality of time frequency resources associated with the plurality of communications on the plurality of uplink beams. In some aspects, the plurality of communications include a scheduling request (SR) associated with SR beam sweeping. In some aspects, the plurality of communications include a scheduling request (SR) and a sounding reference signal (SRS). In some aspects, the UE may transmit the SRS after transmitting the SR.

In some aspects, the UE may transmit the SR on an uplink beam of the plurality of uplink beams, and may transmit the SRS on the uplink beam after transmitting the SR on the uplink beam. In some aspects, the UE may transmit the SR on an uplink beam of the plurality of uplink beams, and may transmit the SRS on a refined uplink beam of the uplink beam after transmitting the SR on the uplink beam. In some aspects, quasi-co-location (QCL) information is transmitted in association with the SR and not in association with the SRS. In some aspects, the information is received in association with at least one of: a physical downlink control channel (PDCCH), or a scheduling grant.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a BS, in accordance with various aspects of the present disclosure. Example process 1100 is an example where a BS (e.g., BS 110) performs facilitation of uplink beam selection for a UE.

As shown in FIG. 11, in some aspects, process 1100 may include receiving, from a UE, a plurality of communications on a plurality of uplink beams (block 1110). For example, the BS (e.g., BS 110 using antenna 234, DEMOD 232, MIMO detector 236, receive processor 238, controller/processor 240, and/or the like) may receive, from a UE, a plurality of communications on a plurality of uplink beams, in a manner that is the same as or similar to that described elsewhere herein.

As further shown in FIG. 11, in some aspects, process 1100 may include performing beam measurements for the plurality of uplink beams based at least in part on receiving the plurality of communications on the plurality of uplink beams (block 1120). For example, the BS (e.g., BS 110 using controller/processor 240 and/or the like) may perform beam measurements for the plurality of uplink beams based at least in part on receiving the plurality of communications on the plurality of uplink beams, in a manner that is the same as or similar to that described elsewhere herein.

As further shown in FIG. 11, in some aspects, process 1100 may include transmitting, to the UE, information that identifies a subset of the plurality of uplink beams to be used for an uplink data transmission based at least in part on receiving the plurality of communications (block 1130). For example, the BS (e.g., BS 110 using controller/processor 240, transmit processor 220, TX MIMO processor 230, MOD 232, antenna 234, and/or the like) may transmit, to the UE, information that identifies a subset of the plurality of uplink beams to be used for an uplink data transmission based at least in part on receiving the plurality of communications, in a manner that is the same as or similar to that described above.

As further shown in FIG. 11, in some aspects, process 1100 may include receiving the uplink data transmission on the subset of the plurality of uplink beams based at least in part on transmitting the information that identifies the subset of the plurality of uplink beams (block 1140). For example, the BS (e.g., BS 110 using antenna 234, DEMOD 232, MIMO detector 236, receive processor 238, controller/processor 240, and/or the like) may receive the uplink data transmission on the subset of the plurality of uplink beams based at least in part on transmitting the information that identifies the subset of the plurality of uplink beams, in a manner that is the same as or similar to that described elsewhere herein.

Process 1100 may include additional aspects, such as any single aspect or any combination of aspects described below and/or in connection with one or more other processes described elsewhere herein.

In some aspects, the BS may receive quasi-co-location (QCL) information of the plurality of uplink beams. In some aspects, the UE may receive a timing of the plurality of uplink beams that indicates a plurality of time frequency resources associated with the plurality of communications on the plurality of uplink beams. In some aspects, the plurality of communications include a scheduling request (SR) associated with SR beam sweeping. In some aspects, the plurality of communications include a scheduling request and a sounding reference signal (SRS).

In some aspects, the BS may receive the SRS after receiving the SR. In some aspects, the UE may receive the SR on an uplink beam of the plurality of uplink beams, and may receive the SRS on the uplink beam after transmitting the SR on the uplink beam. In some aspects, the UE may receive the SR on an uplink beam of the plurality of uplink beams, and may receive the SRS on a refined uplink beam of the uplink beam after transmitting the SR on the uplink beam. In some aspects, QCL information is received in association with the SR and not in association with the SRS. In some aspects, the information is transmitted in association with at least one of: a physical downlink control channel (PDCCH), or a scheduling grant.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

In some aspects, a non-transitory computer readable medium may store code for wireless communication, the code comprising instructions executable by a processor to cause the processor to perform each of the steps of any one of the aspects described herein.

In some aspects, an apparatus may comprise a processor; and a memory coupled with the processor, wherein the memory includes instructions executable by the processor to cause the apparatus to perform each of the steps of any of the aspects described herein.

In some aspects, an apparatus may comprise means for implementing each of the steps of any one of the aspects described herein.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods are described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that the UE has data to transmit;
   transmitting, to a base station (BS) and based at least in part on determining that the UE has the data to transmit, a plurality of communications on a plurality of uplink beams to trigger the BS to perform beam measurements for the plurality of uplink beams,
      the plurality of communications including a scheduling request (SR) and a sounding reference signal (SRS), and
      the SRS being transmitted to the BS after a configured delay from transmitting the SR, without the BS triggering a SRS process, and based on the UE having the data to transmit;
   receiving, from the BS, information that identifies a subset of the plurality of uplink beams to be used for an uplink data transmission based at least in part on transmitting the plurality of communications; and
   transmitting the uplink data transmission on the subset of the plurality of uplink beams based at least in part on receiving the information that identifies the subset of the plurality of uplink beams.

2. The method of claim 1, further comprising:
transmitting quasi-co-location (QCL) information for the plurality of uplink beams.
3. The method of claim 1, further comprising:
transmitting a timing of the plurality of uplink beams that indicates a plurality of time frequency resources associated with the plurality of communications on the plurality of uplink beams.
4. The method of claim 1, wherein the SR is associated with SR beam sweeping.
5. The method of claim 1, wherein transmitting the plurality of communications comprises:
transmitting the SR on an uplink beam of the plurality of uplink beams; and
transmitting the SRS on the uplink beam after transmitting the SR on the uplink beam.
6. The method of claim 1, wherein transmitting the plurality of communications comprises:
transmitting the SR on an uplink beam of the plurality of uplink beams; and
transmitting the SRS on a refined uplink beam of the uplink beam after transmitting the SR on the uplink beam.
7. The method of claim 1, wherein quasi-co-location (QCL) information is transmitted in association with the SR and not in association with the SRS.
8. The method of claim 1, wherein the information is received in association with at least one of:
a physical downlink control channel (PDCCH), or
a scheduling grant.
9. The method of claim 1, wherein the SR and the SRS are transmitted in a same slot.
10. A method of wireless communication performed by a base station (BS), comprising:
receiving, from a user equipment (UE), a plurality of communications on a plurality of uplink beams,
the plurality of communications including a scheduling request (SR) and a sounding reference signal (SRS), and
the SRS being received by the BS after a configured delay from communicating the SR, without the BS triggering a SRS process, and based on the UE having data to transmit;
performing beam measurements for the plurality of uplink beams based at least in part on receiving the plurality of communications on the plurality of uplink beams;
transmitting, to the UE, information that identifies a subset of the plurality of uplink beams to be used for an uplink data transmission based at least in part on receiving the plurality of communications; and
receiving the uplink data transmission on the subset of the plurality of uplink beams based at least in part on transmitting the information that identifies the subset of the plurality of uplink beams.
11. The method of claim 10, further comprising:
receiving quasi-co-location (QCL) information of the plurality of uplink beams.
12. The method of claim 10, further comprising:
receiving a timing of the plurality of uplink beams that indicates a plurality of time frequency resources associated with the plurality of communications on the plurality of uplink beams.
13. The method of claim 10, wherein the SR and the SRS are transmitted in a same slot.
14. The method of claim 10, wherein the SR is associated with SR beam sweeping.
15. The method of claim 10, wherein receiving the plurality of communications comprises:
receiving the SR on an uplink beam of the plurality of uplink beams; and
receiving the SRS on the uplink beam after receiving the SR on the uplink beam.
16. A first apparatus for wireless communication, comprising:
a memory; and
one or more processors operatively coupled to the memory, the memory and the one or more processors configured to:
determine that the first apparatus has data to transmit;
transmit, to a second apparatus and based at least in part on determining that the first apparatus has the data to transmit, a plurality of communications on a plurality of uplink beams to trigger the second apparatus to perform beam measurements for the plurality of uplink beams,
the plurality of communications including a scheduling request (SR) and a sounding reference signal (SRS), and
the SRS being transmitted to the second apparatus after a configured delay from transmitting the SR, without the second apparatus triggering a SRS process, and based on the first apparatus having the data to transmit;
receive, from the second apparatus, information that identifies a subset of the plurality of uplink beams to be used for an uplink data transmission based at least in part on transmitting the plurality of communications; and
transmit the uplink data transmission on the subset of the plurality of uplink beams based at least in part on receiving the information that identifies the subset of the plurality of uplink beams.
17. The first apparatus of claim 16, wherein the memory and the one or more processors are further configured to:
transmit quasi-co-location (QCL) information for the plurality of uplink beams.
18. The first apparatus of claim 16, wherein the memory and the one or more processors are further configured to:
transmit a timing of the plurality of uplink beams that indicates a plurality of time frequency resources associated with the plurality of communications on the plurality of uplink beams.
19. The first apparatus of claim 16, wherein the memory and the one or more processors, based at least in part on transmitting the plurality of communications, are configured to:
transmit the SRS after transmitting the SR.
20. The first apparatus of claim 16, wherein the memory and the one or more processors, based at least in part on transmitting the plurality of communications, are configured to:
transmit the SR on an uplink beam of the plurality of uplink beams; and
transmit the SRS on the uplink beam after transmitting the SR on the uplink beam.
21. The first apparatus of claim 16, wherein the memory and the one or more processors, based at least in part on transmitting the plurality of communications, are configured to:
transmit the SR on an uplink beam of the plurality of uplink beams; and
transmit the SRS on a refined uplink beam of the uplink beam after transmitting the SR on the uplink beam.

22. The first apparatus of claim 16, wherein quasi-co-location (QCL) information is transmitted in association with the SR and not in association with the SRS.

23. The first apparatus of claim 16, wherein the information is received in association with at least one of:
   a physical downlink control channel (PDCCH), or
   a scheduling grant.

24. The first apparatus of claim 16, wherein the SR and the SRS are transmitted in a same slot.

25. A first apparatus for wireless communication, comprising:
   a memory; and
   one or more processors operatively coupled to the memory, the memory and the one or more processors configured to:
      receive, from a second apparatus, a plurality of communications on a plurality of uplink beams,
         the plurality of communications including a scheduling request (SR) and a sounding reference signal (SRS), and
         the SRS being received by the first apparatus after a configured delay from communicating the SR, without the second apparatus triggering a SRS process, and based on the second apparatus having data to transmit;
      perform beam measurements for the plurality of uplink beams based at least in part on receiving the plurality of communications on the plurality of uplink beams;
      transmit, to the second apparatus, information that identifies a subset of the plurality of uplink beams to be used for an uplink data transmission based at least in part on receiving the plurality of communications; and
      receive the uplink data transmission on the subset of the plurality of uplink beams based at least in part on transmitting the information that identifies the subset of the plurality of uplink beams.

26. The first apparatus of claim 25, wherein the memory and the one or more processors, based at least in part receiving the plurality of communications, are configured to:
   receive the SR on an uplink beam of the plurality of uplink beams; and
   receive the SRS on the uplink beam after transmitting the SR on the uplink beam.

27. The first apparatus of claim 25, wherein the memory and the one or more processors, based at least in part on receiving the plurality of communications, are configured to:
   receive the SR on an uplink beam of the plurality of uplink beams; and
   receive the SRS on a refined uplink beam of the uplink beam after transmitting the SR on the uplink beam.

28. The first apparatus of claim 25, wherein the SR and the SRS are transmitted in a same slot.

29. The first apparatus of claim 25, wherein the SR is associated with SR beam sweeping.

30. The first apparatus of claim 25, wherein receiving the plurality of communications comprises:
   receiving the SR on an uplink beam of the plurality of uplink beams; and
   receiving the SRS on the uplink beam after receiving the SR on the uplink beam.

* * * * *